125,248

UNITED STATES PATENT OFFICE.

WILLIAM ADAMSON AND CHARLES F. A. SIMONIN, OF PHILADELPHIA, PENNSYLVANIA, ASSIGNORS TO THE SAID ADAMSON.

IMPROVEMENT IN PRESERVING MEAT FOR FOOD.

Specification forming part of Letters Patent No. 125,248, dated April 2, 1872.

Specification describing an Improvement in the Preparation of Animal Food, invented by WILLIAM ADAMSON and CHARLES F. A. SIMONIN, of Philadelphia, Pennsylvania.

*Improvement in the Preparation of Animal Food.*

Our invention relates to a new article of diet and commerce, consisting of flesh desiccated and deprived of its fat, and reduced in bulk by hydrocarbon vapor, and thereby rendered proof against putrescence and against the ravages of insects, while it retains all its nutritious properties, the flesh being also reduced to such a crisp and friable condition that it can be readily granulated or ground, and used either alone or in conjunction with other nutritious substances as an article of diet.

In introducing this new article of diet we prefer to use the light and volatile hydrocarbons, such as benzine, benzole, gasoline, or naphtha, the vapor of which may be generated and applied to the flesh in many different ways and by different appliances. For instance, apparatus substantially like that described in the patent granted to Lewis S. Robbins, March 24, 1868, for extracting oily and fatty matters, reissued October 3, 1871, might be employed; or the apparatus described in Wm. Adamson's patent, No. 117,135, for extracting resins, granted July 18, 1871; or the said Wm. Adamson's patent, No. 118, 668, granted September 5, 1871. We prefer the apparatus patented by Wm. Adamson, because the flesh can be subjected thoroughly to hydrocarbon vapors under pressure, and because the vapors, after acting on the flesh, can be condensed and re-used, so that there is little or no waste of hydrocarbon.

The effect of the hydrocarbon on the flesh, which may be that of any animal usually killed for food, is to thoroughly desiccate it, deprive it of the fat, and render it anti-putrescent, while it retains all its nourishing ingredients.

After the flesh has been reduced to this condition, it may be exposed to the air or subjected to the action of heated air to evaporate the hydrocarbon, sufficient traces of the latter remaining to prevent the ravages of insects. The flesh is now ready for storage and transportation, and can be sold as an article of commerce.

When required for use all remaining traces of hydrocarbon can be removed by soaking the flesh in water.

The vapor treatment renders the flesh crisp and friable, so that it can be granulated or ground, and packed in a small compass for transportation, and in this pulverized condition it is especially applicable for the making of soups, or for mixing with other nutritious substances in preparing articles of diet.

Flesh may be thus treated at distant points—for instance, in grazing sections of the country, or at points where fish are plentiful; and after treatment, owing to its great reduction in bulk, it may be conveyed in compact packages to cities and towns without any danger of being injured during transportation or storage.

We do not claim extracting fat from animal matter by hydrocarbon vapors, as this is described in the aforesaid patent of Lewis S. Robbins; but

We claim as our invention, and as a new article of diet and commerce—

Flesh desiccated and rendered anti-putrescent and insect-proof by hydrocarbon vapors, as set forth.

In testimony whereof we have signed our names to this specification in the presence of two subscribing witnesses.

WILLIAM ADAMSON.
CHS. F. A. SIMONIN.

Witnesses:
WM. A. STEEL,
HARRY SMITH.